United States Patent [19]
Rossi et al.

[11] Patent Number: 4,664,969
[45] Date of Patent: May 12, 1987

[54] METHOD FOR SPRAY APPLYING A REFRACTORY LAYER ON A SURFACE AND THE LAYER PRODUCED THEREBY

[75] Inventors: Nicholas J. Rossi, Littleton; Edward B. Gaburo, Evergreen, both of Colo.

[73] Assignee: Manville Corporation, Denver, Colo.

[21] Appl. No.: 868,854

[22] Filed: May 30, 1986

[51] Int. Cl.$^4$ .............................................. B05D 1/12
[52] U.S. Cl. .................................. 428/284; 427/196; 427/205; 427/426; 428/288
[58] Field of Search ...................... 427/196, 205, 426; 428/284, 288

[56] References Cited

U.S. PATENT DOCUMENTS

| | | |
|---|---|---|
| 1,718,507 | 6/1929 | Wenzel et al. |
| 2,433,463 | 12/1947 | Lampe . |
| 2,604,416 | 7/1952 | Dolbey . |
| 2,842,897 | 7/1958 | Finn . |
| 2,850,421 | 9/1958 | Thompson . |
| 2,929,436 | 3/1960 | Hampshire . |
| 3,107,057 | 10/1963 | Hanusch . |
| 3,171,874 | 3/1965 | Rolle . |
| 3,959,063 | 5/1986 | Hawthorne . |
| 4,272,935 | 6/1981 | Lukas et al. |
| 4,375,493 | 3/1983 | George et al. ...................... 428/284 |
| 4,492,766 | 1/1985 | Zverina et al. |
| 4,547,403 | 10/1985 | Smith . |

FOREIGN PATENT DOCUMENTS

| | | |
|---|---|---|
| 1458912 | 1/1969 | Fed. Rep. of Germany . |
| 49-87723 | 8/1974 | Japan . |
| 51-40846 | 11/1976 | Japan . |
| 120358 | 10/1975 | Norway . |
| 1142201 | 2/1969 | United Kingdom . |
| 1182241 | 2/1970 | United Kingdom . |
| 2093015 | 8/1982 | United Kingdom . |

OTHER PUBLICATIONS

"New Sprayable Ceramic Fiber with Special Binder Provides Economical System for Insulating Furnaces" by Jerry Barrows; *Industrial Heating;* Apr., 1986, vol. LII, No. 4, pp. 20-21.
Ceramospray Advertising Literature by CAFCO and United States Mineral Company, Jan., 1984.
Keith Refractories Ltd. Technical Data Sheet, Oct. 1, 1982 and Material Safety Data Sheet, Nov. 12, 1985.
Keith Refractories Ltd. Advertising Literature for K-REF Bonds, Manville Corporation; Cerabond Advertising Literature, Dec. 1984.

*Primary Examiner*—Shrive P. Beck
*Attorney, Agent, or Firm*—John D. Lister; Cornelius P. Quinn; Timothy R. Schulte

[57] ABSTRACT

A method for spray applying refractory fiber to a surface. An alumina containing binder, preferably aluminum chloride, is used in a spray method to bond the fiber to itself and to a substrate surface. A refractory layer comprised of fiber and binder produced by the method of the invention is also disclosed.

16 Claims, 4 Drawing Figures

METHOD FOR SPRAY APPLYING A REFRACTORY LAYER ON A SURFACE AND THE LAYER PRODUCED THEREBY

BACKGROUND OF THE INVENTION

1. Field of the Invention

The invention relates to the field of coating processes. More particularly, the invention relates to a plural direction application of coating materials by simultaneously applying fiber and binder from different sources. In still greater particularity, the invention relates to a spray application of refractory fibers to a surface with an alpha alumina crystal forming binder. By way of further characterization, but not by way of limitation thereto, the invention is a method for applying refractory fibers with an aluminum chloride binder.

2. Description of the Prior Art

Spray application of refractory fiber is a desirable method for producing a refractory material in furnaces, kilns, and other thermally insulated structures. Advantages of such a method include reduced costs and reduced down time for a furnace or the like. That is, as opposed to previous methods of relining furnaces, requiring either manual replacement of brick or mechanically attaching refractory fiber linings, spray insulation may be easily and quickly applied to the surfaces. A number of spray methods and applications have been previously disclosed. However, none of these previous methods or applications result in a refractory lining which adheres to the substrate upon which it is applied and remains there during thermal cycling and exposure to elevated temperatures of 2200° F. or more.

One example of a prior method for applying refractory fiber is disclosed in U.S. Pat. No. 4,547,403 issued on Oct. 15, 1985. The method disclosed in that patent utilizes an aluminum phosphate based binder. While suited for its intended purpose, this method suffers from the limitation that the refractory layer sprayed upon a substrate surface may debond from that substrate upon thermal cycling. That is, while the method may result in bonding of the refractory fiber one to another, the bond between the fiber-binder layer and the substrate upon which it is sprayed may be deficient. That patent also discloses a colloidal alumina-clay binder which suffers from the same weak bond line at the substrate interface.

Another method for applying refractory insulations utilizes refractory fibers and a hydraulic setting-inorganic binder. This product is marketed under the trademark CERAMOSPRAY ® which is a registered trademark of the U.S. Mineral Products Company. While suited for its intended purpose, this method utilizes a dry cementitious binder which is limited in its temperature range to a stated maximum of 2200° F. In addition, a cementitious binder such as calcium aluminate or calcium phosphate may adversely affect silicate based brick products at temperatures in excess of 2000° F., thus effectively reducing the maximum service temperatures of these cementitious refractory materials in such applications. Mechanical anchors are also required with this method. While suited for its intended purpose, such a system would be unsuitable for use in high temperature applications and may be unsuitable for applications in which a refractory lining is sprayed onto a brick substrate. Since the majority of furnaces and kilns are brick lined, such a system may find little application in these areas.

Still another spraying method is disclosed in U.K. Patent application Nos. 2,093,014 and 2,093,015. These applications utilize phosphate bonding and suffer from the limitations discussed above with other phosphate bonding agents. In addition, these applications disclose a system utilizing a dry composition which is more difficult to control in a spray method than applicants' liquid binder.

Still another spray application method is disclosed in Japanese Pat. Nos. 51-40846 and 49-87723. These references disclose the use of dry alumina cement the amount of which must be limited to avoid very high densities thereby affecting the thermal insulating properties of the layer. In addition, as stated in those references, when used in large quantities the scattering of cement dust creates an undesirable pollution problem. While the use of colloidal alumina is disclosed, it is only disclosed with a dry material such as bentonite to give it bonding characteristics. Such a system may suffer from weak bonding at the substrate interface.

Finally, another sprayable ceramic fiber insulation system marketed under the trademark FIBER-BRAX ®, a trademark of the Sohio Engineered Materials Company (CARBORUNDUM) is a sprayable system which is rated to a maximum temperature of 2100° F. While suited for its intended application, the system is limited in temperature application and is also a silica based binder material which is subject to debonding at the substrate interface as with the clay and phosphate binders. In addition, this is a two part system in which the fiber is pre-coated thus potentially suffering from the dry binder separation limitations discussed above. To improve the bonding of the layer to the substrate, mechanical anchors are recommended for many applications. As can be appreciated by one skilled in the art, the use of anchors increases cost and furnace down time. Anchors are also unsuitable for a badly deteriorated brick or other substrate since attachment of the anchors to the substrate may be difficult and/or dangerous.

SUMMARY OF THE INVENTION

The present invention is directed to a method for spray applying a refractory material to a surface utilizing an alpha alumina (Corundum) crystal forming binder material and to the refractory layer produced thereby. The binder is a liquid binder which is sprayed into the stream of refractory fibers which have been directed toward the surface to be insulated. Upon curing, the liquid is driven off, thus resulting in an alpha alumina crystal forming material which provides a strong bond for attaching the refractory layer to the substrate. The curing of the layer is at a temperature in excess of 230° F. to drive out all of the moisture and preferably at a temperature of approximately 700° F. or more to produce the crystalline alumina bond. That is, while the 230° F. cure will produce a bonded layer, it is the 700° F. cure which produces the crystalline alumina bond which is preferred. Because of the strong bond, mechanical anchors are not required. The temperature of the furnace, kiln or other structure can be immediately raised to temperatures in excess of 2000° F. without damage to the refractory layer. While the refractory layer service temperature is limited somewhat by the service temperature of the refractory fiber used, as can be seen below, even the refractory fiber service temperature may be exceeded in some instances. Thus, temperatures up to 3000° F. and more may be achieved.

The liquid binder which is employed with the method is preferably an aluminum chloride based binder. That is, the binder comprises a liquid containing approximately: 63% alumina; 6.2% soluble chlorides, 0.02% $SiO_2$; 0.02% $Fe_2O_3$; 0.02% CaO and MgO; 0.25% $Na_2O_3$; and approximately 30% water. One suitable aluminum chloride binder is available from KEITH Refractories, Ltd., of Kent, England. Upon curing, the chlorides and the water are driven off leaving a crystalline alumina bond between the fibers and between the fiber layer and substrate. Where the substrate includes silica containing brick, a chemical bond between the crystalline alumina in the binder and the silica brick occurs. Thus, a refractory layer is produced which does not require mechanical fastening, which can withstand extremely high temperatures and which will not debond from the substrate upon repeated thermal cycling. That is, the bond between the fiber-binder layer and the substrate is strong enough to withstand the repeated differential thermal expansion and contraction encountered as a result of the thermal cycling.

DESCRIPTION OF THE PREFERRED EMBODIMENT

Figure 1:
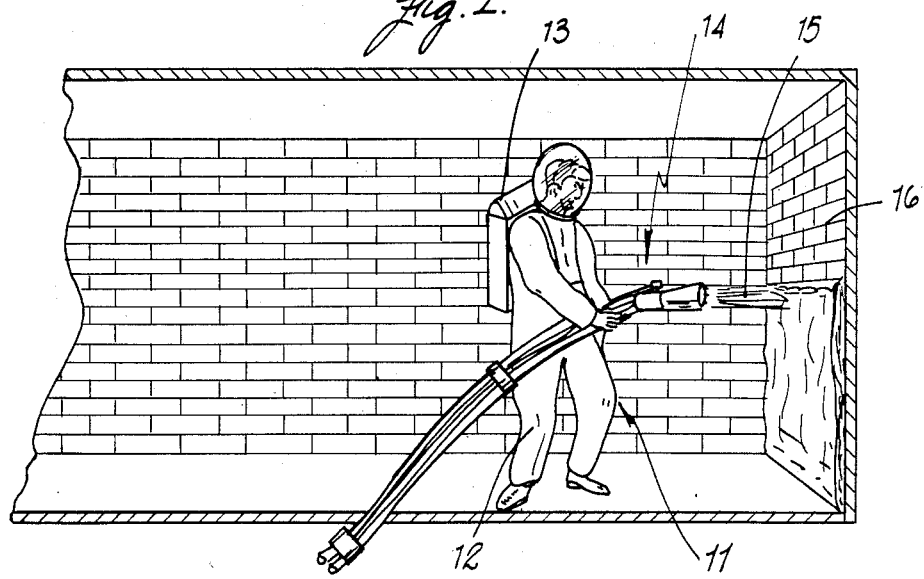
FIG. 1 is an illustration of an operator applying the refractory material to a brick substrate.

Referring to FIG. 1, an operator (11), dressed in suitable protective clothing (12), including an enclosed breathing apparatus (13), is shown holding a spraying apparatus generally designated as (14) from which a stream (15) of binder coated refractory fiber is being directed onto a substrate (16). As used herein, refractory fibers are defined as inorganic, amorphous, or crystalline fibers which are not adversely affected by temperatures in excess of 1500° F. Examples of such fibers are ceramic fibers such as alumina-silica-zirconia, alumina-silica and other fibers as are known in the art. Preferably, the fiber is blown by air pressure from a suitable pneumatic apparatus (not shown). The substrate (16) may be a bare metal wall of a furnace or it could be a brick substrate as is shown in FIG. 1. It may be appreciated that the present method may also be utilized with any substrate such as refractory castables or other materials as are known in the art. Similarly, substrate (16) may be refractory fiber modules which have been mechanically attached as is known in the art.

Figure 2:
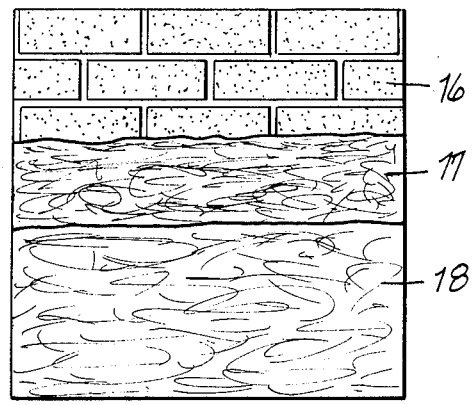
FIG. 2 is a partial cutaway view of the refractory material on the brick substrate illustrating two layers.

Referring to FIG. 2, a partial cutaway view of the furnace wall is shown. Substrate (16), which in this case includes refractory brick such as dense refractory brick or insulating fire brick as is known in the art is coated with two layers of refractory fiber and binder utilizing the method of the present invention. That is, it has been found that to increase the bonding characteristics of the present method, it may be desirable in some applications to spray a concentrated solution of binder with a thin layer (approximately ½ inch) of refractory fiber (17) followed by a more dilute solution of the binder in a thicker insulating layer (18). Preferably, two parts of aluminum chloride binder are diluted with one part by volume water in order to spray this layer. Following layer (17), a more dilute solution of one part by volume binder to up to four parts by volume water is used to spray the relatively thicker layer (18) (four inches or more) of refractory material. It should be expressly understood that layer (17) is optional and that the more diluted solution of binder and fiber which forms layer (18) may be applied directly to the substrate in many applications. In this manner refractory layers of up to twelve inches thickness or more may be achieved. It has been found in laboratory testing that the 2:1 solution was about the maximum that many pumps can spray due to the viscosity of the solution. However, a greater concentration of aluminum chloride binder to water may be utilized with pumps which can spray higher viscosity liquid.

Figure 3:
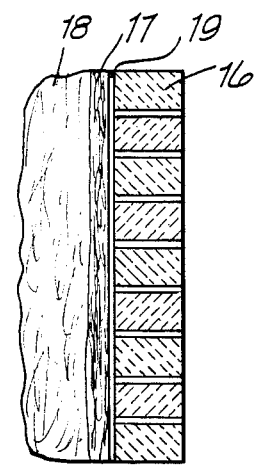
FIG. 3 is a side sectional view of the refractory material applied to the brick substrate.

Referring to FIG. 3, a side sectional view of the layer is shown. In this layer of refractory material, a 2:1 solution of binder only was sprayed directly onto the brick substrate (16) as illustrated by layer (19). While this layer of binder was still wet, layer (17) was sprayed thereon and then layer (18) as described above. This embodiment gives extremely strong adhesion of the refractory layer to the substrate.

Figure 4:
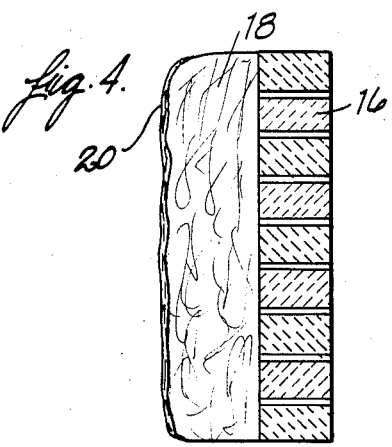
FIG. 4 is a side sectional view of the refractor material applied to the brick substrate in one layer.

Referring to FIG. 4, an alternate embodiment of the method is disclosed wherein a diluted layer of binder and fiber (18) is sprayed directly onto brick substrate (16). That is, it is possible to spray fiber, for example, with a binder solution of approximately one part aluminum chloride by volume to four parts water by volume directly onto the substrate without the layer of binder (19) or the less dilute layer of binder and fiber (17). After the insulating layer has been spray applied, a layer of binder 20, diluted or not, may optionally be sprayed over the fiber binder layers.

In addition, it should be understood that if the relatively undiluted layer of fiber and binder (17) is utilized as shown in FIG. 2 and sprayed directly onto the substrate, a binder such as aluminum phosphate or some of the other binders disclosed in the prior art may be utilized with fiber to form layer (18). That is, because some of these binders, especially the aluminum phosphate binders, are suitable for adhering fibers one to another, a layer comprising that fiber and binder may be put over layer (17) which is applied using the present claimed method.

While ease of installation is a primary advantage of the present invention it should be appreciated that the flexibility in densities achievable with the present invention also allows the thermal conductivity of the refractory layer to be kept relatively low. Densities of up to 40 $lb/ft^3$ or more are achievable by practicing the present invention with 12–35 $lb/ft^3$ being the preferred density range. The thermal conductivity limitations of refractory fiber insulation alone can be reduced with the present invention. That is, as is known in the art, the thermal conductivity of refractory fiber increases rather sharply at mean temperatures of approximately 1800° F.–2000° F. By utilizing the present invention the thermal conductivity of the refractory layer can be reduced. For example, the thermal conductivity (as measured in BTU in/Hr. $Ft^2°F.$) of a refractory layer of the present invention employing aluminum chloride binder and refractory fiber sold by Manville Corporation under the trademark CERACHEM ® and sprayed to a density of 35 $lb/ft^3$ is as follows:

| Mean Temperature | Thermal Conductivity |
|---|---|
| 500° F. | 0.60 |
| 1000° F. | 0.75 |
| 1500° F. | 1.25 |
| 1800° F. | 1.51 |
| 2000° F. | 1.63 |
| 2200° F. | 1.75 |

Thus, it can be appreciated that the present invention offers superior thermal conductivity performance.

EXAMPLE 1

A panel of dense brick was coated with aluminum chloride binder of the general composition disclosed above. The panel was then sprayed while the undiluted binder was still wet with approximately a one inch layer of fiber-binder where the binder was a solution of 60% aluminum chloride based binder with 40% water by volume. Approximately 3.5 inches of fiber was then sprayed with a binder composed of 50% solution by volume of monoaluminum phosphate and water. A second panel was sprayed with undiluted aluminum chloride binder alone directly onto the brick and then sprayed with a 4-5 inches of 40% aluminum chloride-water solution by volume used as a binder with the fiber. Thermal cycling was accomplished by exposing the test panels to a temperature gradient starting at approximately room temperature and increased to a hot face temperature of approximately 2400° F. over an 8 hour period once a day for six days. At the end of each 8-hour period, the furnace was shut off and the panels allowed to return to room temperature. Thus, extreme thermal shock occurred during each cycle and no delamination was observed of the aluminum chloride bonded fiber to the brick substrate.

EXAMPLE 2

A section of a brick furnace, approximately 15 square feet, was sprayed with undiluted aluminum chloride binder as the pre-coat layer (19). A one inch layer of refractory fiber with the approximate 2:1 by volume binder-water dilution was sprayed while the precoat layer was still wet. While water was used to dilute the aluminum chloride binder, it should be understood that colloidal alumina or other suitable diluents may be utilized. The approximate 2:1 dilution produced a layer with approximately 30-40 lbs per cubic foot density. Layer (18) was sprayed with approximately 8-12 lbs per cubic foot density using both a 25% by volume dilution of aluminum chloride with water and with a 33% dilution of liquid monoaluminum phosphate to water. Finally, a coat of the diluted binder was applied to the exposed face of the refractory layer. These insulating layers were cycled twenty five times from room temperature to 2400° F. for approximately eight hours and then allowed to cool overnight before being exposed to 2400° F. the following day. No delamination was observed after this severe thermal shock test. In addition, the hot face temperature of the layers was taken to 2800° F. for a period of two hours. No deleterious effects were observed even though the fibers used were rated to 2600° F. Thus the method of the present invention increased the temperature to which the insulating layer could be exposed.

EXAMPLE 3

A cylindrical preheat furnace that measured approximately 400 square feet and which was lined with nine inches of castable refractory material as is known in the art was sprayed using the method of the present invention. A 2:1 by volume aluminum-chloride binder to water solution was applied as a precoat layer (19) for better adhesion. This was followed by a ½ inch layer of refractory fiber with a 2:1 by volume aluminum chloride to water binder solution. A 1:2 binder to water solution by volume was then sprayed with the refractory fiber to a thickness of about four inches. Finally, the 1:2 binder-water solution was sprayed over the binder-fiber layer.

A total of 650 pounds of medium length refractory fiber sold under the Manville trademark CERA-CHEM ®, was applied 3-4 inches thick with 37 gallons or approximately 605 pounds of aluminum chloride binder. The total application time took approximately 2½ hours and the furnace was immediately brought up to a temperature of 2400° F. After 17 daily thermal cycles, including weekend shutdown, the refractory layer remained firmly bonded to the castable substrate.

While the aluminum chloride binder formulation disclosed in the above examples and descriptions is preferred, it should be expressly understood that other alumina containing binders may be employed. That is, an alumina based solution with approximately 40 or more percent aluminum oxide may also be used. Any such solution which forms alpha alumina (Corundum) upon curing at approximately 700° F. or more may be utilized. The superior performance of this binder is believed to result from the disassociation of the chlorides and water at temperatures in excess 700° F., leaving high purity alumina as the sintering bond. This bond is preferred to bonds such as clay, phosphates, and silicates which tend to debond from the substrate as discussed above.

EXAMPLE 4

Two experimental panels were constructed out of dense refractory brick. Each panel measured 3'×3'×4", and were identified as panel A and panel B. The experimental procedure is described below:

Panel A: This panel was pre-wetted with a 65% by volume aluminum phosphate and water solution. A 2'×2' area was sprayed with the 65% binder solution and a medium length refractory fiber to a desired thickness of 4 inches. After spraying, the fiber-binder insulation layer was coated with a light spray of binder-only solution.

Panel B: This panel was pre-wetted with a 50% by volume aluminum chloride and water solution. A 2'×2' area was sprayed with the 50% binder solution and the same medium length refractory fiber used for Panel A to a desired thickness of 4 inches. After spraying with fiber, the insulation was coated with a light spray of binder-only solution.

Both panels were made so as to fit the two open sides of a gas fired hearth. They were allowed to air dry for 18 hours prior to being placed in the hearth. After air drying the furnace was brought up to a temperature of 2400° F. for 7.5 hours. This continued for two cycles, after which the panels were removed to reveal that the Panel A insulation layer had completely and cleanly delaminated from the brick substrate while Panel B remained firmly bonded to the brick.

What is claimed is:

1. Method for producing a refractory layer on a substrate comprising the steps of:
   directing a stream of refractory fibers toward said substrate;
   spraying a liquid binder into said stream during said step of directing so as to substantially coat said fibers with said binder, said binder capable of forming alpha alumina (Corundum) crystals upon curing; and
   curing said coated fibers on said substrate so as to produce an alpha alumina (Corundum) crystal bond between at least some of said fibers and said substrate.

2. Method according to claim 1 wherein said binder includes an aluminum chloride solution.

3. Method according to claim 1 further including the step of, prior to said step of directing said fibers, coating said surface to be sprayed with said binder.

4. Method according to claim 2 wherein said aluminum chloride binder is diluted with water in an approximate dilution ratio by volume of two parts binder to one part water.

5. Method according to claim 3 wherein said binder is diluted in a ratio of approximately two parts by volume binder to one part water.

6. Method according to claim 2 wherein said binder includes approximately up to four parts by volume water to one part aluminum chloride solution.

7. Method according to claim 1 wherein the ratio of fiber to binder is approximately one pound fiber to one pound binder.

8. Method according to claim 1 further including, after said step of spraying, the step of applying a sprayed layer of fibers using a binder including aluminum phosphate.

9. Method according to claim 1 further including, after said step of spraying, the step of applying a coating of said liquid binder onto said refractory layer.

10. Method according to claim 2 wherein said undiluted aluminum chloride binder includes, in approximate weight percent:

| | | | |
|---|---|---|---|
| $Al_2O_3$ | 63.0% | $CaO + MgO$ | 0.02% |
| $SiO_2$ | 0.02% | $Na_2O$ | 0.25% |
| $Fe_2O_3$ | 0.02% | Chloride | 6.2% |
| | | Water | 30.5% |

11. Method according to claim 1 further including, after said step of spraying, the step of applying a sprayed layer of fibers using a binder including colloidal silica.

12. Method according to claim 1 further including, after said step of spraying, the step of applying a sprayed layer of fibers using a binder including colloidal alumina.

13. Method according to claim 1 wherein the density of said refractory layer is up to 40 lb/ft$^3$.

14. Method according to claim 1 wherein said step of curing includes exposing said refractory layers to a mean temperature of at least approximately 700° F.

15. Method according to claim 1 wherein said step of curing includes exposing said refractory layer to a mean temperature of at least approximately 230° F.

16. An article comprising a refractory layer bonded to a substrate according to the method of claims 1, 2, 10 or 13.

* * * * *